US008181117B2

(12) United States Patent  (10) Patent No.: US 8,181,117 B2
Bruce et al.  (45) Date of Patent: May 15, 2012

(54) DISPLAY OF PREDICTED STORAGE STATE OF TARGET COMPUTING DEVICE DURING MEDIA FILE SYNCHRONIZATION

(75) Inventors: John W. Bruce, Redmond, WA (US); David Jones, Seattle, WA (US); Andrew L. Silverman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 447 days.

(21) Appl. No.: 12/255,102

(22) Filed: Oct. 21, 2008

(65) Prior Publication Data

US 2010/0107104 A1    Apr. 29, 2010

(51) Int. Cl.
G06F 3/048 (2006.01)
G06F 3/00 (2006.01)
(52) U.S. Cl. .......... 715/771; 715/748; 715/772
(58) Field of Classification Search .......... 715/751, 715/772, 764, 801, 805, 704, 255, 771; 345/788, 345/781, 805–806, 835, 841, 854–855, 866
See application file for complete search history.

(56) References Cited

U.S. PATENT DOCUMENTS

| 6,874,130 | B1* | 3/2005 | Baweja et al. ........ 715/805 |
| 7,239,802 | B2* | 7/2007 | Ishida et al. ........ 386/230 |
| 7,242,856 | B2* | 7/2007 | Ishida et al. ........ 386/230 |
| 7,415,707 | B2* | 8/2008 | Taguchi et al. ........ 717/174 |
| 2005/0235015 | A1 | 10/2005 | Abanami et al. |
| 2005/0246451 | A1* | 11/2005 | Silverman et al. ........ 709/231 |
| 2006/0041893 | A1 | 2/2006 | Castro et al. |
| 2006/0194549 | A1 | 8/2006 | Janik et al. |
| 2006/0224620 | A1 | 10/2006 | Silverman et al. |
| 2006/0230038 | A1 | 10/2006 | Silverman et al. |
| 2007/0169087 | A1 | 7/2007 | Fadell |
| 2007/0192723 | A1* | 8/2007 | Anzelde et al. ........ 715/772 |
| 2008/0114766 | A1* | 5/2008 | Asmi et al. ........ 707/8 |
| 2008/0168185 | A1* | 7/2008 | Robbin et al. ........ 709/248 |
| 2008/0168391 | A1* | 7/2008 | Robbin et al. ........ 715/810 |
| 2008/0168516 | A1* | 7/2008 | Flick et al. ........ 725/112 |
| 2008/0168526 | A1* | 7/2008 | Robbin et al. ........ 725/139 |

OTHER PUBLICATIONS

Non-Patent Literature: Reenskaug, Trygve; "Models-Views-Controllers" published Dec. 10, 1979.*
"Windows Media Player 11" Copyright 2008 Microsoft Corporation, (Retrieved Sep. 12, 2008). Webpage Available at: http://www.microsoft.com/windows/windowsmedia/player/11/everywhere.aspx.

(Continued)

*Primary Examiner* — Doon Chow
*Assistant Examiner* — Wilson Varga
(74) *Attorney, Agent, or Firm* — Alleman Hall McCoy Russell & Tuttle LLP

(57) ABSTRACT

A system and method for synchronizing media files stored on a plurality of computing devices. The system includes a source computing device configured to execute a synchronization engine configured to synchronize media files on the source computing device with copies of the media files on a target computing device. The synchronization engine may be configured to display a file synchronization interface including a synchronization control having a plurality of media file selectors configured to receive user input of a selected set of the media files for synchronization. The system further may include a prediction module configured to compute a predicted storage state of the target computing device based on an available storage capacity of the target computing device and an estimated destination file size of each of the selected set of media files, and display the predicted storage state on a graphical predicted storage state gauge.

15 Claims, 3 Drawing Sheets

OTHER PUBLICATIONS

Kim, et al., "Apple iTunes 7", Posted Jul. 17, 2008. Webpage Available at: http://www.applesource.com.au/reviews/soa/Apple-iTunes-7/0,2000070834,339270997,00.htm.

"Sync to Symbian phones from iTunes", Published by Rafe Blandford on Sep. 8, 2008. Webpage Available at: http://www.allaboutsymbian.com/news/item/7985_Sync_to_Symbian_phones_from_iT.php.

Easy Sync "Flexible Files, Folders and Storage Card Sync between Windows Mobile devices and Windows PC" (Retrieved Sep. 12, 2008). Webpage Available at: http://easy-sync.info/.

\* cited by examiner

DISPLAY OF PREDICTED STORAGE STATE OF TARGET COMPUTING DEVICE DURING MEDIA FILE SYNCHRONIZATION

BACKGROUND

Portable digital media players have become popular in recent years, because of their small size and ability to enable users to access digital media files on the go. Users typically store most or all of their digital media collections on personal computers, which have large storage capacities, and store only a portion of their digital media collections on portable media players, since these devices tend to have smaller storage capacities than personal computers. As a result, synchronization programs have been developed that assist users in managing the process of selecting and transferring media files between a personal computer and a portable media players.

However, current synchronization programs suffer from the drawback that in some situations they do not provide a user with sufficient information for the user to efficiently manage the synchronization process. For example, during a file transfer operation, current synchronization programs do not offer the user sufficient feedback regarding whether the portable media player has sufficient storage capacity to accommodate the transfer of selected files. As a result, the user may not be able to complete a desired file transfer, and/or may have difficulty in selecting files to delete on the portable media player in order to make room for the file transfer.

SUMMARY

A system and method for synchronizing media files stored on a plurality of computing devices are provided. The system may include a source computing device configured to execute a synchronization engine configured to synchronize media files stored on the source computing device with copies of the media files stored on a target computing device. The synchronization engine may be configured to display a file synchronization interface including a synchronization control having a plurality of media file selectors configured to enable a user to choose a selected set of the media files for synchronization. The system further may include a prediction module configured to compute a predicted storage state of the target computing device based on an available storage capacity of the target computing device and an estimated destination file size of each of the selected set of digital media files. The prediction module may be configured to display the predicted storage state on a graphical predicted storage state gauge on the file synchronization interface.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
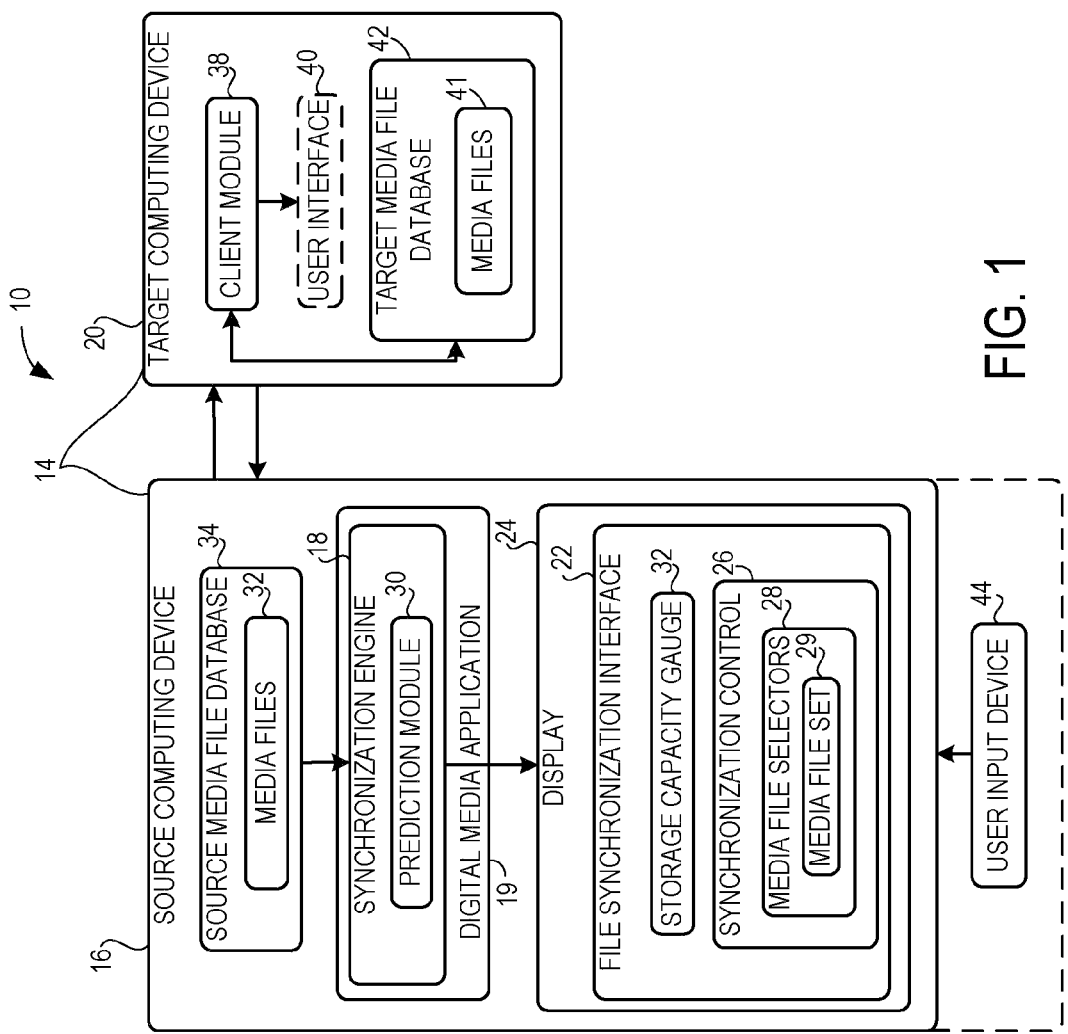
FIG. 1 shows a schematic representation of system for synchronizing media files stored on a plurality of computing devices, including a source computing device and a target computing device.

FIG. 1 illustrates a system 10 for synchronizing media files 12 stored on a plurality of computing devices 14. The system includes a source computing device 16 configured to execute a synchronization engine 18. The synchronization engine 18 is configured to synchronize some or all of media files 32 stored on the source computing device with copies of the media files 41 stored on a target computing device 20. The synchronization engine 18 is configured to display a file synchronization interface 22 on a display 24 associated with the source computing device. The file synchronization interface 22 includes a synchronization control 26 having one or a plurality of media file selectors 28. The media file selectors are configured to receive user input of a selected set 29 of the media files for synchronization between the source computing device and the target computing device.

During synchronization, the synchronization engine 18 determines whether each of the selected set 29 of media files is present on the target computing device 20, and transfers any media files that are not present from the source computing device to the target computing device. In some cases, the media file formats, resolutions, bit-rates, etc. may be converted prior to transfer, as described below. Further, media files 41 that are present on the target computing device but that are not included within the selected set 29 of media files will be deleted from the target computing device during synchronization.

To aid the user in determining whether the target device has sufficient available storage capacity to accommodate the synchronization of the selected set 29 of media files, system 10 further includes a prediction module 30 configured to compute a predicted storage state of target computing device 20. The predicted storage state is computed based on an available storage capacity of the target computing device and an estimated destination file size of each of the selected set of digital media files. The prediction module is configured to display the predicted storage state on a graphical predicted storage state gauge 36 on the file synchronization interface 22, allowing a user to quickly identify the available storage capacity of the target computing device.

Using the media file selectors 28 in combination with the predicted storage state gauge, a user can experiment with different file synchronization scenarios, comparing how different media file selections affect the storage capacity required for synchronization, without actually commencing the synchronization process or deleting files, thus customizing as well as accelerating the synchronization process. Specific embodiments of the file synchronization interface and predicted storage state gauge are discussed in more detail herein with regard to FIGS. 3-4.

It will be appreciated that the synchronization engine 18 may be included in a digital media application 19 configured to present the media files to the user on the source computing device and manage the transfer of media files to the target computing device 20. The digital media application 19 may be configured to store the media files 32 on the source computing device 16 in a source media file database 34. The media files may be of a suitable file type, such as music files, video files, podcasts, game files, and/or image files.

Source computing device 16 may include code stored in memory for implementing routines to achieve the functionality described herein via one or more processors. At least one user input device 44 may be in communication with various components of the source computing device, such as the synchronization engine, allowing the user choose a set of media files for transfer. Suitable user input devices include a mouse, keyboard, touch sensor, touch screen, trackball, etc.

As an example, the source computing device 16 may be a personal computer, such as a desktop or laptop computer, and target computing device 20 may be a portable media player device. Alternatively, the source computing device 16 may be another suitable computing device such as a server, network data store, distributed file sharing system, etc. In other embodiments the target computing device 20 may be another suitable computing device, such as a smart phone, portable data assistant, mobile phone, etc. Typically, the source computing device 16 has a larger data storage capacity than the target computing device 20, although other variations are possible.

Continuing with FIG. 1, target computing device 20 may further include a client module 38 configured to perform various operations. The operations may include, but are not limited to, implementing communication between the target and source computing devices, generating a user interface 40, de-coding and encoding media files, storing synchronized media files 41 in a target media file database 42, playback for media files to a user, etc.

Figure 2:
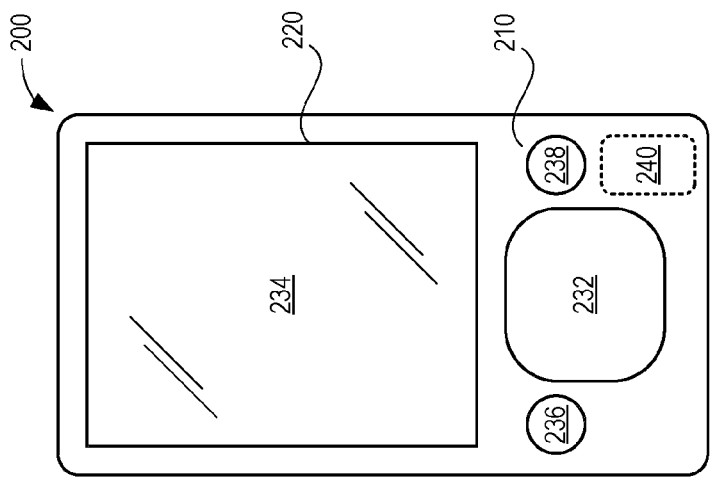
FIG. 2 shows an illustration of an exemplary target computing device of the system of FIG. 1.

FIG. 2 illustrates an example of the target computing device 20 of FIG. 1, in the form of a portable media player device 200. Portable media player device 200 may include a display 220, which is analogous to display 24 of FIG. 1. Display 220 may present the media files that are played by client module 38. Additional components may be included in the portable media player device 200 to present media files to a user such as audio and or video outputs.

In some embodiments, display 220 may include a touch-sensitive region 234. Display 220 may present a graphical representation of a button at the touch-sensitive region of the graphical display, whereby user input may be received via the touch-sensitive region of the display when a user touches the graphical representation of the button. In addition to or instead of the touch sensitive region 234, portable media player device 200 may include a plurality of buttons 232, 236, and 238. In some embodiments, buttons 232, 236, and 238 may include mechanical buttons or touch-sensitive buttons.

Portable media player device 200 may further include computer programs stored in memory for implementing routines to achieve the functionality described herein via one or more processors. The memory, processor, as well as additional electronic componentry may reside within or on-board a device body 210 of portable media player device 200. It should be appreciated that portable media player device 200 merely provides a non-limiting example of target computing device 20 of FIG. 1.

Figure 3:
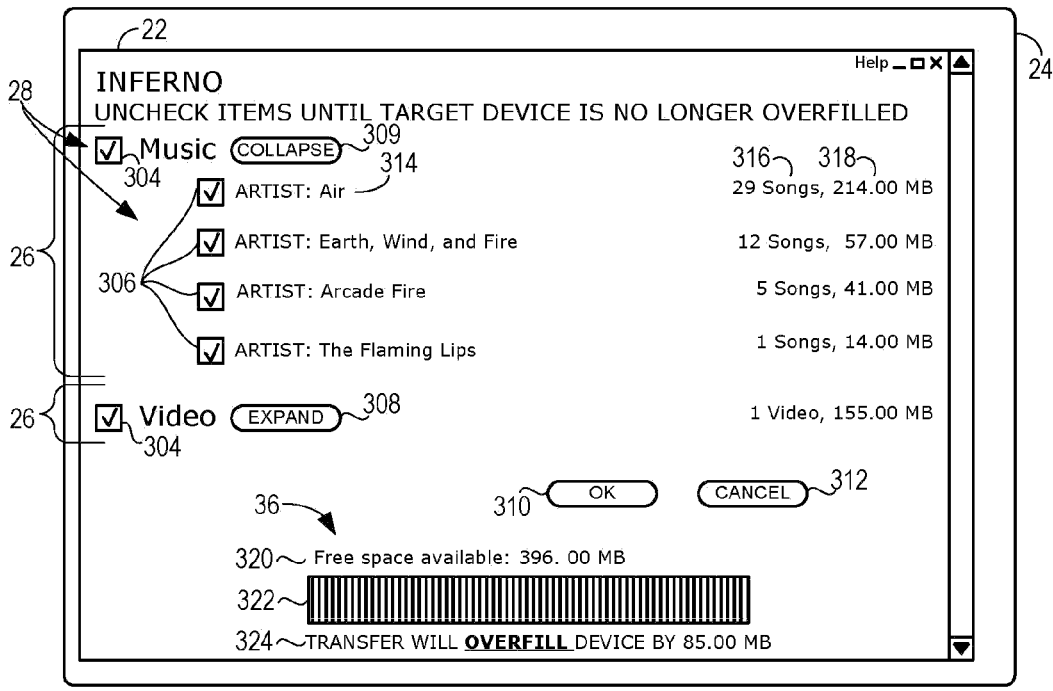
FIG. 3 shows a first screen of the file synchronization interface of FIG. 1.
Figure 4:
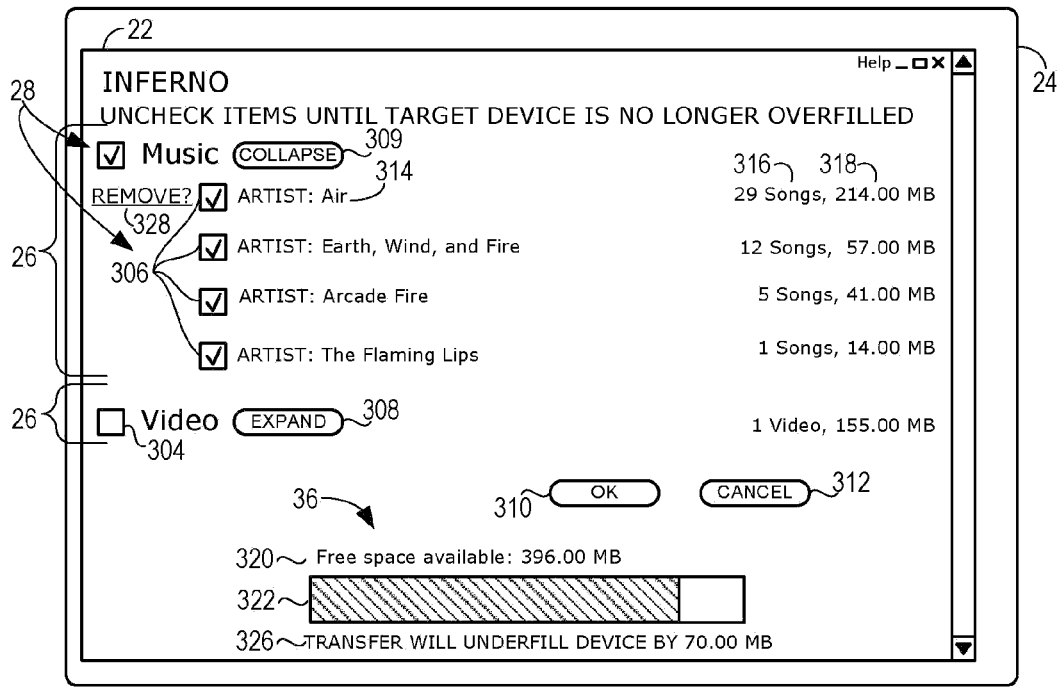
FIG. 4 shows a second screen of the file synchronization interface of FIG. 1.

FIG. 3 and FIG. 4 illustrate an exemplary embodiment of file synchronization interface 22, which may be presented on display 24 of source computing device 16, shown in FIG. 1. The file synchronization interface 22 includes a plurality of synchronization controls 26, each having one or a plurality of media file selectors 28 configured to enable a user to choose a selected set of the media files for transfer. The synchronization controls 26 are typically organized into a menu hierarchy, which may be expandable and collapsible via expand button 308 and collapse button 309. In the depicted embodiment, the top level of the menu hierarchy of the synchronization control 26 is organized by file type. Music and video are depicted as two possible file types. It will be appreciated that synchronization controls 26 for other file types, such as podcasts, images, games, etc., may also be included.

The media file selectors 28 may include a category specific select/deselect all selector 304 for each file type, by which a user may select or deselect all subcategories within that category to be selected or deselected for synchronization. The media file selectors 28 may further include subcategory specific selectors, such as the depicted artist selectors 306. Subcategory selectors 306 may be provided for a variety of other subcategories, such as genre, album, etc. Typically, the subcategory selectors 306 are displayed in order of decreasing file size 318, so that a user may quickly identify subcategories that might free up memory for a transfer.

It will be appreciated that each media file selector 28 is associated with one or more media files, and may include metadata about the associated media files, such as subcategory information 314, number of files 316, and file size 318, as shown. Subcategory information may include artist information such as the name of the artist, genre information such as a genre name, album information such as album name, etc. Each media file selector 28 further includes a selection mechanism, such as a check box, by which a user may indicate whether the associated media files on the source computing device are selected for synchronization with the target computing device. Thus, it will be appreciated that each of the checked boxes in FIGS. 3 and 4 indicate associated media files selected for synchronization, and each of the unchecked boxes indicate the media files which are not selected for synchronization. As a result, the set of media files selected for synchronization includes the media files corresponding to the checked boxes.

The graphical predicted storage state gauge 36 of the file synchronization interface 22 is configured to display a predicted storage state of the target computing device based on the selected set of files for synchronization. The predicted storage state may include an available storage capacity of the target computing device prior to synchronizing the selected set of media files, which is displayed via capacity indicator 320, a predicted storage usage of the target computing device were the synchronization operation to be undertaken, which is displayed via bar graph 322, and an overfill condition or underfill condition, respectively displayed via an overfill message 324 (FIG. 3) or an underfill message 326 (FIG. 4), which indicate to the user whether and by what extent the proposed transfer of the selected set of media files will overfill or underfill the available storage capacity of the target computing device.

It should be appreciated that while the depicted gauge 36 is linear and contains a bar graph, other forms of gauges could be employed, such as circular gauges with pie graphs, etc. Further, although the capacity indicator 320, overfill message 324, and underfill message 326 are shown in text form, it will be appreciated that these may include graphical elements as well. Also, in addition to the overfill message 324 and underfill message 326, the bar graph 322 may be configured to provide a graphical indication of the underfill condition or overfill condition. For example, during the overfill condition the bar graph may be configured to be presented in a predetermined pattern or color that is distinguishable from the underfill condition.

The bar graph 322 may be configured such that it has a scale with a maximum value that is set to the value of the available storage capacity of the target computing device, or some other maximum threshold, and a minimum value of zero, or some other minimum threshold. On this scale, the bar graph 322 is configured to graphically display a predicted storage usage of the target computing device. The predicted storage usage may be computed according to the following formulas.

$$\text{Predicted Storage Usage} = \text{Available Storage Capacity} - \text{Estimated Destination File Size of Set of Files} \quad (1)$$

$$\text{IF (Predicted Storage Usage} > \text{Available Storage Capacity) THEN Predicted Storage Usage} == \text{Available Storage Capacity} \quad (2)$$

As shown in Equation (2), the predicted storage usage may be defined so that it does not exceed the available storage capacity of the target computing device. Thus, as shown in FIG. 3, in an overfill condition when the estimated destination file size of the set of media files selected for transfer exceeds the available storage capacity of the target computing device, the graph visually indicates this overfill condition, for example, by displaying a bar graph 322 that indicates 100% full, and/or changing the bar graph 322 to a predefined color or pattern.

During use, a user may select and deselect various media file selectors 28 for the many categories and subcategories of each transfer control 26, and view corresponding changes in the predicted storage state gauge 36. As described above, the predicted storage state gauge 36 is configured to indicate in real time as the user selects the selected set of media files, whether a storage capacity of the device would be exceeded by the transfer of the selected set of media files, and/or a predicted post-transfer storage capacity remaining on the target computing device, were the file transfer completed.

Once a desired set of media files is selected which does not cause an overfill condition, the user may actuate button 310, labeled "OK", to initiate media file synchronization between source computing device 16 and target computing device 20. The synchronization engine 18 may be configured to inhibit synchronization of one or more of the selected set of media files when the predicted storage state of target computing device 20 includes an overfilled condition. This may be accomplished, for example, by making the OK button 310 unselectable until the overfill condition is resolved. In such a case, the synchronization engine 18 may be configured to prompt the user to continue deselecting media file selectors until the overfill condition is abated. If the user desires to abort the synchronization process, the user may actuate button 312, labeled "CANCEL".

As shown in FIG. 4, to aid the user in determining which media files to deselect in the event of an overfill condition, the synchronization engine 18 may be configured to identify one or more media files recommended for de-selection, and display a suggested removal indicator 328 adjacent the media file selector 28 corresponding to the one or more media files recommended for de-selection, when the predicted storage state of the target computing device is determined to be overfilled. The recommended de-selection may be based on metadata associated with the media files. For example, metadata such as file size, user rating, file usage, and file duplication may be considered. Thus, media file selectors 28 corresponding to large file sizes, or infrequently accessed files, files that have low user or peer ratings, or files that are determined to be duplicates on the target computing device, may be recommended for de-selection.

The estimated destination file size discussed above may be computed by taking into account one or more size variation factors that affect stored media file size on the target computing device. For example, various processes may be performed to reduce the size of the digital media files and/or adjust the digital media file format for transfer from source computing device 16 to the target computing device 20. For example, a compression-decompression (CODEC) algorithm may be used to perform compression during synchronization to reduce the media file size for storage on the target computing device. Additionally, transcoding may be used to digitally convert the media files from one type of CODEC to another type of CODEC, for example, to store the media file in a more compressed format on the target computing device, or to convert from a format unsupported by the target computing device to a format supported by the target computing device. Further, the size and resolution of image files may be adjusted, as may be bit-rate of audio or video files, to reduce the file size on the target computing device. For example, to decrease the size of the transferred media files the target computing device may have a predetermined threshold bit-rate and/or resolution, which may be set by the user. If the bit-rate and/or resolution of the media file exceed the threshold bit-rate or resolution the bit-rate or resolution will be reduced to the threshold value during or prior to file transfer from the source computing device to the target computing device.

Hence, in some embodiments the prediction module is configured to compute the estimated destination file size based on one or more of the file size variation factors discussed above, including file trans-coding, file bit-rate, image size and resolution, and/or codec file encoding. In some embodiments the file size variation factors are user selectable predetermined parameters; for example, the user may specify a desired bit-rate, image resolution, etc. for files stored on the target computing device.

Figure 5:
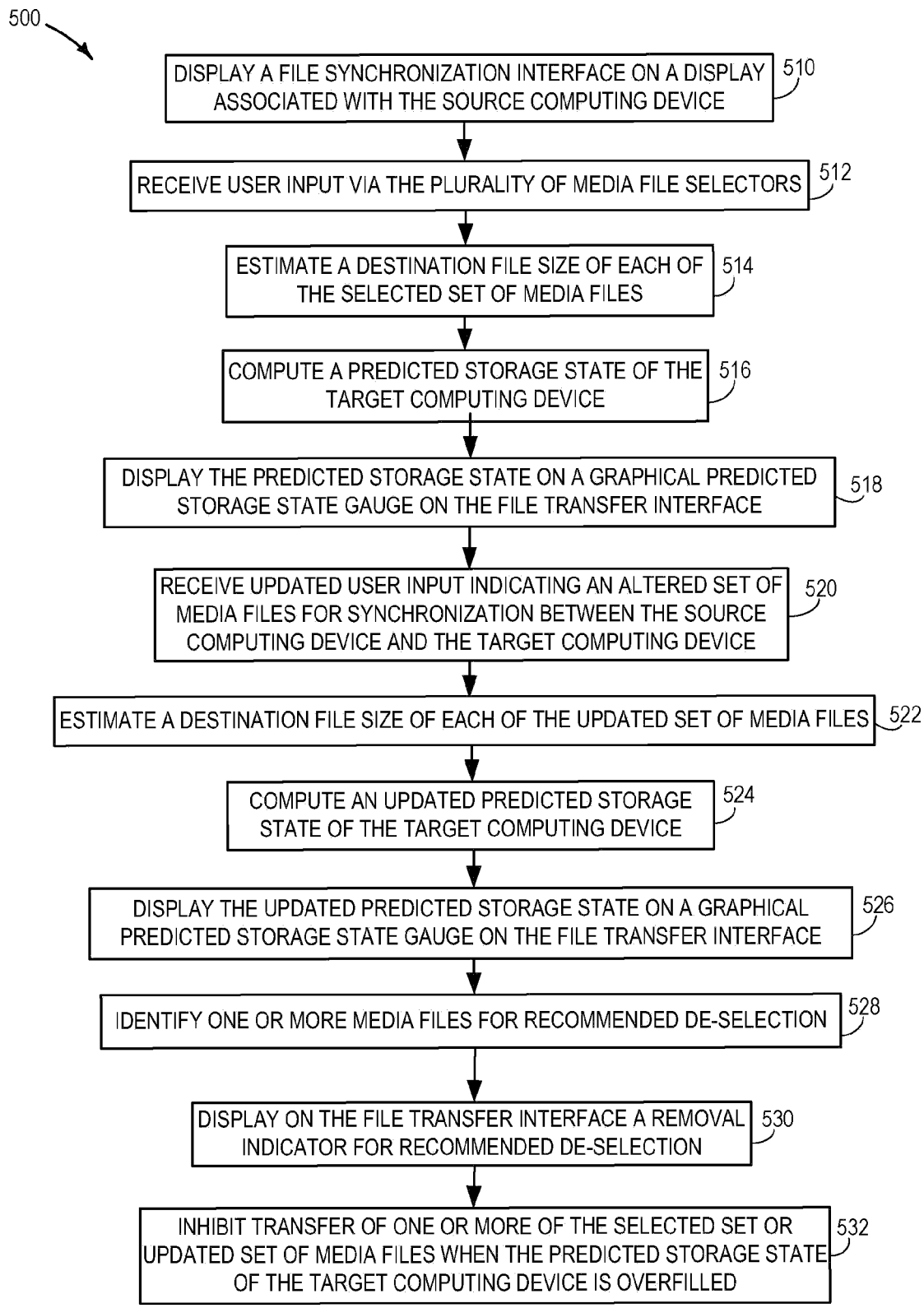
FIG. 5 illustrates a flowchart of one embodiment of a method for synchronizing a source computing device with a target computing device.

FIG. 5 illustrates a method 500 for synchronizing media files stored on a source computing device and a target computing device. The method 500 may be implemented using the hardware and software components of the systems and devices described above, but alternatively may be implemented using other suitable hardware and software components. As described above, the source computing device may be a personal computer and the target computing device may be a portable media player device, and the personal computer may have a larger data storage capacity than the portable media player. However, it can be appreciated that alternatively other suitable computing devices may be used having different storage capacities.

At 510, the method includes displaying a file synchronization interface on a display associated with the source computing device. The file synchronization interface includes a synchronization control having a plurality of media file selectors.

Next, at 512, the method includes receiving user input via the plurality of media file selectors, indicating a selected set of the media files for synchronization between the source computing device and the target computing device. The media files may include music files, video files, podcasts, game files, and/or image files. As illustrated at 514, the method includes estimating a destination file size of each of the selected set of media files. The various techniques described above may be used to estimate the file size of the selected set of media files.

At 516, the method includes computing a predicted storage state of the target computing device based on an available storage capacity of the target computing device and the estimated destination file size of each of the selected set of digital media files. The estimated destination file size may be computed based on one or more file size variation factors. The file size variation factors may include file trans-coding, file bit-rate, image resolution, and/or codec file encoding, as discussed above. As described above the predicted storage state may include an available storage capacity of the target computing device prior to synchronizing the selected set of media files, a predicted storage usage of the target computing device were the synchronization operation to be undertaken, and an overfill condition or underfill condition that indicate to the user whether and by what extent the proposed transfer of the selected set of media files will overfill or underfill the available storage capacity of the target computing device.

At 518, the method includes displaying the predicted storage state on a graphical predicted storage state gauge on the file synchronization interface. The available storage capacity, a predicted storage usage, overfill condition, and underfill condition may be displayed via various textual and graphical elements of the gauge, as described above.

At 520, the method may include receiving updated user input via the plurality of media file selectors indicating an altered set of media files for synchronization between the source computing device and the target computing device.

Next, at 522, the method includes estimating a destination file size of each of the updated set of media files. The various techniques described above may be used to estimate the file size of the updated set of media files. Next, at 524, the method includes computing an updated predicted storage state of the target computing device, based on the available storage capacity of the target computing device and the estimated destination file size of each of the updated set of media files.

Next, at 526, the method includes displaying the updated predicted storage state on a graphical predicted storage state gauge on the file synchronization interface. By repeatedly selecting and deselecting media file selectors, the user may experiment and compare storage predictions for different set of files, prior to commencing a synchronization operation.

At 528, the method may include identifying one or more media files for recommended de-selection, so that the deselected files will not be included in the synchronization operation. In some embodiments, identifying the one or more media files for recommended de-selection is performed based on metadata associated with the media files, such as file size, user rating, file usage, and file duplication, as described above.

At 530, the method may include displaying on the file synchronization interface a removal indicator for recommended de-selection adjacent the one or more media files identified for de-selection. The removal indicator for recommended de-selection is displayed when the predicted storage state of the target computing device determined to be is overfilled. Additionally, at 532, the method includes inhibiting transfer of one or more of the selected or updated set of media files when the predicted storage state of the target computing device is overfilled.

The above described systems and methods may enable a user to quickly and effectively synchronize a source computing device with a target computing device, potentially increasing user satisfaction with the synchronization process.

While one source computing device and one target computing device are illustrated by way of example, it will be appreciated that multiple target computing device and/or target computing devices may be used, as desired. Thus, for example, three, four, or more source and target computing devices may be provided, and the systems and methods described above may be configured to process in parallel synchronization from the various source and target computing devices.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A system for synchronizing media files stored on a plurality of computing devices, the system comprising a source computing hardware device configured to execute:
   a synchronization engine, and configured to synchronize media files stored on the source computing hardware device with copies of the media files stored on a target computing hardware device, the synchronization engine further configured to display a file synchronization interface on a display associated with the source computing hardware device, the file synchronization interface including a synchronization control having a plurality of media file selectors configured to receive user input for a synchronization operation, which indicates a selected set of the media files for synchronization between the source computing hardware device and the target computing hardware device; and
   a prediction module configured for computing a predicted storage state of the target computing hardware device based on an available storage capacity of the target computing hardware device and an estimated destination file size for each of the media files of the selected set of media files, and for displaying the predicted storage state on a graphical predicted storage state gauge on the file synchronization interface, the predicted storage state gauge indicating a predicted storage usage of the target computing hardware device were the synchronization operation to be undertaken, the computing and the displaying being repeated as the user input is received prior to the synchronization;
   wherein the synchronization engine is configured to identify one or more media files for recommended de-selection and to display a removal indicator adjacent the media file selectors corresponding to the one or more media files for recommended de-selection, when the predicted storage state of the target computing hardware device is determined to include an overfill condition.

2. The system of claim 1, wherein the predicted storage state gauge is configured to display an overfill message and/or a graphical indication of an overfill condition in response to the prediction module determining that the predicted storage state includes the overfill condition.

3. The system of claim 2, wherein the predicted storage state gauge is further configured to display a bar graph indicating the predicted storage state; and wherein the graphical indication of the overfill condition is a predetermined pattern or color that is distinguishable from a graphical indication of an underfill condition.

4. The system of claim 1, wherein the synchronization engine is included in a digital media application configured to present the media files to the user and manage synchronization of the media files between the source computing hardware device and target computing hardware device.

5. The system of claim 1, wherein the source computing hardware device is a personal computer and the target computing hardware device is a portable media player device, and the source computing hardware device has a larger data storage capacity than the target computing hardware device.

6. The system according to claim 1, wherein the prediction module is configured to compute the estimated destination file size for each of the media files of the selected set of media files based on one or more file size variation factors that are selected from the group including file trans-coding, file bitrate, image resolution, and codec file encoding.

7. The system of claim 1, wherein the synchronization engine is configured to inhibit transfer of one or more of the media files of the selected set of media files in response to the predicted storage state of the target computing hardware device indicating an overfill condition.

8. The system of claim 1, wherein the synchronization engine is configured to identify the one or more media files for recommended de-selection based on metadata associated with the media files, the metadata being selected from a group including file size, user rating, file usage, and file duplication.

9. The system of claim 1, wherein the media files include music files, video files, podcasts, game files, and/or image files.

10. A method for synchronizing media files stored on a source computing hardware device and a target computing hardware device, the method comprising:
displaying a file synchronization interface on a display associated with the source computing hardware device, the file synchronization interface including a synchronization control having a plurality of media file selectors;
receiving user input for a synchronization operation via the plurality of media file selectors indicating a selected set of the media files for synchronization between the source computing hardware device and the target computing hardware device;
estimating a destination file size of each of the media files of the selected set of media files;
computing a predicted storage state of the target computing hardware device based on an available storage capacity of the target computing hardware device and the estimated destination file size of each of the media files of the selected set of media files;
displaying the predicted storage state on a graphical predicted storage state gauge on the file synchronization interface, the predicted storage state gauge indicating a predicted storage usage of the target computing hardware device were the synchronization operation to be undertaken;
identifying one or more media files for recommended de-selection;
displaying on the file synchronization interface, in response to the predicted storage state indicating an overfill condition, a removal indicator for recommended de-selection adjacent the media file selectors corresponding to the one or more media files identified for de-selection; and
repeating the computing, the identifying, and the displaying as the user input is received prior to the synchronization.

11. The method of claim 10, wherein the synchronization engine is configured to inhibit transfer of one or more of the media files of the selected set of media files in response to the predicted storage state indicating an overfill condition.

12. The method of claim 10, wherein the source computing hardware device is a personal computer and the target computing hardware device is a portable media player device, and the personal computer has a larger data storage capacity than the portable media player device.

13. The method according to claim 10, wherein the estimated destination file size of each of the media files of the selected set of media files is computed based on one or more file size variation factors, the file size variation factors being selected from a group including file trans-coding, file bit-rate, image resolution, and codec file encoding.

14. The method of claim 10, wherein the identifying the one or more media files for recommended de-selection is based on metadata associated with the media files, the metadata being selected from a group including file size, user rating, file usage, and file duplication.

15. The method of claim 10, wherein the media files include music files, video files, podcasts, game files, and/or image files.

* * * * *